US011276085B2

(12) United States Patent
Valecha et al.

(10) Patent No.: US 11,276,085 B2
(45) Date of Patent: Mar. 15, 2022

(54) GENERATING CUSTOMIZATION DATA CONFIGURED TO CUSTOMIZE DEMONSTRATION OF A PRODUCT TO A TARGET AUDIENCE

(71) Applicant: International Business Machines Corporation, Armonk, NY (US)

(72) Inventors: Vinod A. Valecha, Pune (IN); Krzysztof Rudek, Nowy Wisnicz (PL); Markus Blohberger, Warngau (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 16/010,040

(22) Filed: Jun. 15, 2018

(65) Prior Publication Data
US 2019/0385195 A1 Dec. 19, 2019

(51) Int. Cl.
*G06Q 30/02* (2012.01)
*G06F 16/28* (2019.01)
*G06Q 50/00* (2012.01)

(52) U.S. Cl.
CPC ....... *G06Q 30/0269* (2013.01); *G06F 16/285* (2019.01); *G06Q 30/0204* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 7,516,152 B2 | 4/2009 | Chitgupakar et al. | |
| 9,087,353 B2 | 7/2015 | Razvi et al. | |
| 9,805,427 B2 | 10/2017 | Jemiolo et al. | |
| 2002/0138492 A1 | 9/2002 | Kil | |
| 2007/0011188 A1 | 1/2007 | Chitgupakar et al. | |
| 2007/0156537 A1 | 7/2007 | Peters | |
| 2007/0269775 A1* | 11/2007 | Andreev | G09B 7/00 434/156 |

(Continued)

FOREIGN PATENT DOCUMENTS

WO     2015187813 A1    12/2015

OTHER PUBLICATIONS

Bersimis, Multivariate Statistical Process Control Charts and the Problem of Interpretation: A short overview and some applications in industry, 2006, Proceeding of the 7th Hellenic European Conference on Computer Mathematics and its Applications (Year: 2006).*

(Continued)

*Primary Examiner* — Rutao Wu
*Assistant Examiner* — Zahra Elkassabgi
(74) *Attorney, Agent, or Firm* — Cuenot, Forsythe & Kim, LLC

(57) ABSTRACT

Context data pertaining to a target audience to which a product is to be demonstrated can be determined. The target audience can be classified based on the context data. Classifying the target audience can include selecting an audience type out of a predefined plurality of audience types. Customization data can be generated based on the selected audience type. The customization data can be configured to customize demonstration of the product to the target audience.

18 Claims, 4 Drawing Sheets

(56) References Cited

U.S. PATENT DOCUMENTS

| | | | | |
|---|---|---|---|---|
| 2011/0195390 A1* | 8/2011 | Kopriva | ................... | G09B 7/02 |
| | | | | 434/362 |
| 2012/0016937 A1* | 1/2012 | Merrifield | .............. | G06Q 10/10 |
| | | | | 709/204 |
| 2012/0102114 A1* | 4/2012 | Dunn | ..................... | G06Q 10/10 |
| | | | | 709/204 |
| 2012/0239497 A1* | 9/2012 | Nuzzi | .................... | G06Q 30/02 |
| | | | | 705/14.53 |
| 2014/0120516 A1* | 5/2014 | Chiang | ................... | G09B 5/02 |
| | | | | 434/362 |
| 2016/0224320 A1* | 8/2016 | Jemiolo | ................ | G06Q 50/01 |

OTHER PUBLICATIONS

"A method of providing customised presentations based on the client user's environment," [online] ip.com I, LLC © 2009-2018, Disclosure No. IPCOM000223691D, Nov. 23, 2012, retrieved from the Internet: <https://priorart.ip.com/IPCOM/000223691>, 2 pg.

* cited by examiner

GENERATING CUSTOMIZATION DATA CONFIGURED TO CUSTOMIZE DEMONSTRATION OF A PRODUCT TO A TARGET AUDIENCE

BACKGROUND

The present invention relates to data processing systems, and more specifically, to data processing systems used to present demonstrations.

Demonstrations commonly are built to demonstrate a particular product, for example a computer program. Oftentimes demonstrations are built for a primary audience. For example, demonstrations may be built for Public Sector clients, private companies or organizations, or built for recent college graduates. In some cases, members of the audience are given an opportunity to interact with product being demonstrated, which can help to familiarize the audience members with the product.

SUMMARY

A method includes determining context data pertaining to a target audience to which a product is to be demonstrated. The method also can include classifying, using a processor, the target audience based on the context data, the classifying the target audience comprising selecting an audience type out of a predefined plurality of audience types. The method also can include generating customization data based on the selected audience type, the customization data configured to customize demonstration of the product to the target audience.

A system includes a processor programmed to initiate executable operations. The executable operations include determining context data pertaining to a target audience to which a product is to be demonstrated. The executable operations also can include classifying the target audience based on the context data, the classifying the target audience comprising selecting an audience type out of a predefined plurality of audience types. The executable operations also can include generating customization data based on the selected audience type, the customization data configured to customize demonstration of the product to the target audience.

A computer program product includes a computer readable storage medium having program code stored thereon. The program code is executable by a data processing system to initiate operations. The operations include determining context data pertaining to a target audience to which a product is to be demonstrated. The operations also can include classifying the target audience based on the context data, the classifying the target audience comprising selecting an audience type out of a predefined plurality of audience types. The operations also can include generating customization data based on the selected audience type, the customization data configured to customize demonstration of the product to the target audience.

DETAILED DESCRIPTION

Figure 1A:
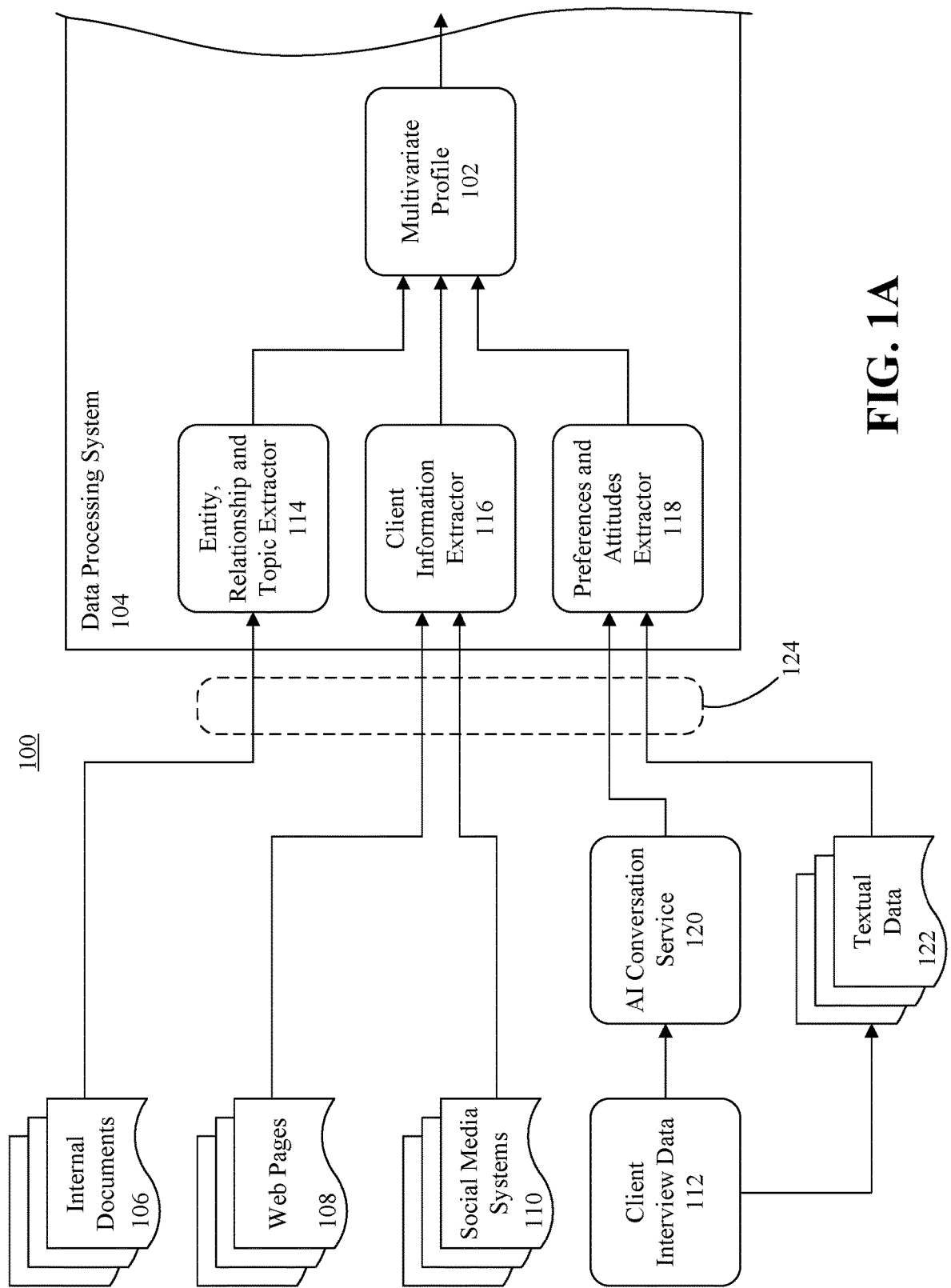
FIGS. 1A and 1B, together, present a block diagram illustrating example architecture for a computing environment in which a demonstration of a product is customized.

This disclosure relates to data processing systems, and more specifically, to data processing systems used to present demonstrations. Such demonstrations can be enterprise-level demonstrations of technology (e.g., a computer program), generally in-person, by a specialist in the technology.

Demonstrations are often built for a primary audience. For example, if a demonstration is targeted to clients that reside in a particular country, the names and addresses of sample cases used in the demonstration data sets can be for that country. Other demonstrations are built for Public Sector clients, or for recent college graduates. This is fine when the target audience remains relatively stable, but a particular demonstration may not resonate as well with different potential clients. A mismatch between and expected audience and the actual audience may be a barrier that prevents audience members from providing full attention to the demonstration.

In accordance with the inventive arrangements disclosed herein, the relevance of demonstrations to potential clients (or customers) can be enhanced by customizing the demonstrations to context familiar to the clients. In this regard, the present arrangements can cognitively develop customized views of demonstrations that are material to the target audience. This improves the attention of clients to demonstrations. Moreover, the present arrangements can improve client interactions with demonstrations, for example when clients use a user interface presented by the demonstration to explore a product (e.g., a computer program) being presented.

The present arrangements can include generating and using a multivariate profile derived from data collection and machine learning. The multivariate profile can be used to customize a demonstration for a particular audience to whom the demonstration is to be presented. The multivariate profile can be generated by collecting readily available background information and using this information to build the multivariate profile. The background information can be assembled from many sources of information, such as information about the customer (both enterprise and individual client) available in public documents, emails, phone conversations, blogs, and other forms of social media. The multivariate profile can be generated using a cognitive approach to establish context for the demonstration so that material presented to potential clients is based on the entirety of information available to the organization presenting the demonstration. In this regard, users of any demonstration system interact within a context. They do not view information provided in the demonstration in a vacuum. Instead, they process outputs against their surroundings and preferences. As user context varies it is entirely possible that reactions to demonstration system outputs also will vary.

Several definitions that apply throughout this document now will be presented.

As defined herein, the term "demonstration" means a presentation presented, at least in part, on a display or by a projector that exhibits a product, and may further explain how the product works. In illustration, if the product is a computer program, the demonstration can present the computer program on a display of a data processing system, allowing a presenter and/or audience members to interact with the computer program via a user interface of the computer program. The demonstration also can present information (e.g., audio/video and/or still images) about the computer program that is distinct from the computer program.

As defined herein, the term "audience" means a group of one or more persons to whom a demonstration is presented or is to be presented.

As defined herein, the term "customize" means to modify a demonstration for a particular audience.

As defined herein, the term "multivariate profile" means a profile comprising profile data determined using a multivariate analysis.

As defined herein, the term "multivariate analysis" means an analysis that includes simultaneously analyzing a plurality of statistical outcome variables.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "output" means storing in memory elements, writing to display or other peripheral output device, sending or transmitting to another system, exporting, or similar operations.

As defined herein, the term "automatically" means without user intervention.

As defined herein, the term "audience member" means a person (i.e., a human being).

As defined herein, the term "user" means a person (i.e., a human being).

Figure 1B:
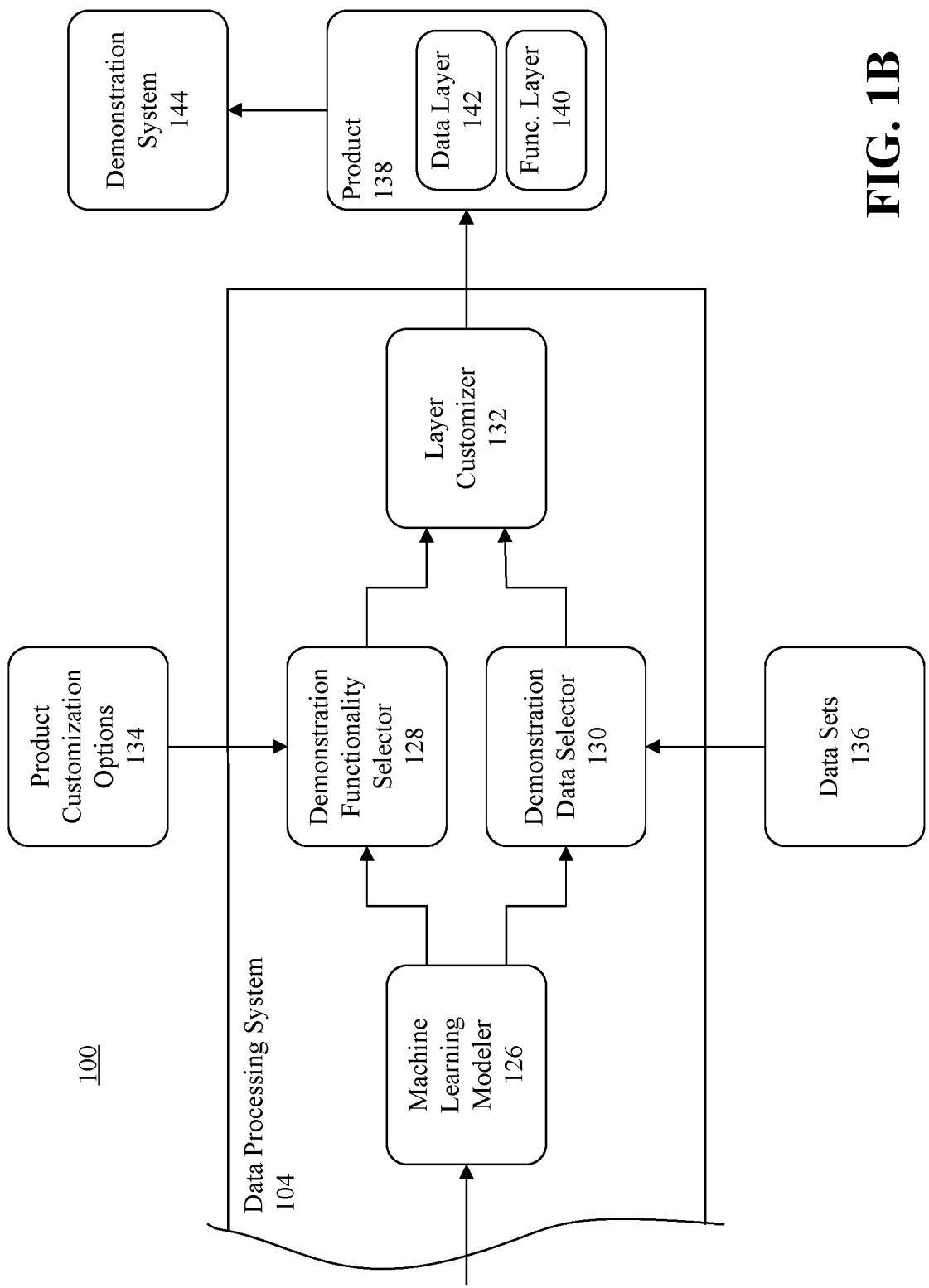

FIGS. 1A and 1B, together, present a block diagram illustrating example architecture for a computing environment (environment) 100 in which a demonstration of a product is customized, for example based on a multivariate profile 102. Referring to FIGS. 1A and 1B, the environment 100 can include a data processing system (system) 104. Depiction of the system 104 extends from FIG. 1A to FIG. 2B.

From a high-level perspective, the system 104 can identify potential or existing clients, for example people who may be members of an audience to whom a demonstration of a product (e.g., a computer program) is to be presented. Further, the system 104 can collect information likely to contain information about the clients. In this regard, the system 104 can collect a reasonably broad scope of information that encompasses relevant mentions of the clients that are detected. Data sources for the information can include, for example, internal documents 106, web pages 108, social media systems 110 and client interview data 112. The system 104 can employ natural language processing (NLP) to extract data for entities, relations, topical mentions, etc. This data can be used to build the multivariate profile 102. Further, the system 104 can augment the multivariate profile 102 with additional information indicative of preferences and attitudes, for example data collected from collected from the social media systems 110. The system 104 can leverage information from the multivariate profile 102 to generate a candidate score. The candidate score can reflect objective client information, such as location, industry and purchasing behavior, etc., augmented by information pertaining to client interests and attitudes. The system 104 can leverage the candidate score and information contained in the multivariate profile 102 to customize/tailor a demonstration of a product for the audience, ensuring that the demonstration focuses on information deemed to be relevant to the audience.

In illustration, referring to FIG. 1A, the system 104 can include an entity, relationship and topic extractor (ERTE) 114, a client information extractor (CIE) 116, and a preferences and attitudes extractor (PAE) 118. The ERTE 114 can be configured to access internal documents 106, retrieve data from the internal documents 106 related to the target audience to whom the demonstration is to be presented, and extract context data from the retrieved data. The retrieved data can identify an entity (e.g., a business or organization) that is the customer or potential customer for the product being demonstrated, information about that entity, a list of people who will be audience members for the demonstration (e.g., decision makers), relationships among the audience members, topics of interest/concern for the audience members, and so on. From the data retrieved from the internal documents 106, the ERTE 114 can selectively extract context data and add such context data in the multivariate profile 102. The system 104 can store the multivariate profile 102 in a suitable data storage device or suitable data storage devices, for example in a database.

The CIE 116 can be configured to access web pages 108 and social media systems 110, retrieve data (e.g., content) from the web pages 108 and social media systems 110 data related to the customer and/or audience members for the demonstration, and extract context data from the retrieved data. For example, if customer is an organization or a client associated with an organization, the CIE 116 can retrieve data from web pages 108 that are related to the that organization. Such context data can include data pertaining to the mission of the organization, products/services provided by the organization, data pertaining to leaders and/or other people involved in the organization, sectors/customers/clients serviced by the organization, geographic data indicating where offices of the organization are located, geographic data indicating geographic regions serviced by the organization, and so on.

The data retrieved from the social media systems 110 can include, for example, data from advertisements presented for the organization in the social media systems 110, data from posts in the social media systems 110 made by leaders or other members of organization, data from posts in the social media systems 110 made by members of the target audience, data from posts in the social media systems 110 presented to members of the target audience, data from posts in the social media systems 110 to which members of the target audience have responded, data from posts in the social media systems 110 which mention the organization, leaders of the organization, other members of the organization, and/or members of the target audience, messages exchanged with the target audience, and so on. From the data retrieved from the web pages 108 and social media systems 110, the CIE 116 can selectively extract context data and add such context data in the multivariate profile 102.

The PAE 118 can be configured to receive client interview data 112 generated through client interviews with members of the target audience or other people. The client interview data 112 can include audio data (e.g., spoken utterances) and/or textual data. In the case of audio data, the PAE 118 can interface with an artificial intelligence (AI) conversation service 120, such as IBM Watson® Conversation Service, or a speech recognition engine that converts spoken utterances contained in the client interview data 112 to textual data. In an arrangement in which the AI conversation service 120 is used, the AI conversation service 120 can be trained or customized to identify data which provides insights to the clients, for example preferences and/or attitudes toward the product that is to be demonstrated. In the case of client interview data 112 contains textual data 122, the PAE 118 can retrieve the textual data 122 from the client interview data 112. The PAE 118 can receive and process the textual data generated by the AI conversation service 120 (or speech recognition engine) and/or the textual data 122, and selectively extract context data from the textual data, for example context data indicating preferences and/or attitudes of the clients that are interviewed, such as preferences and/or attitudes toward the product that is to be demonstrated. The PAE 118 can add the context data derived from the client interview data 112 to the multivariate profile 102.

To extract context data from the various data sources 106-112, the ERTE 114, CIE 116 and PAE 118 can implement natural language processing (NLP) and semantic analysis. In one aspect, the AI conversation service 120 can perform NLP and semantic analysis on textual data generated from spoken utterances contained in the audio portions of the client interview data 112. NLP is a field of computer science, artificial intelligence and linguistics which implements computer processes to facilitate interactions between computer systems and human (natural) languages. NLP enables computers to derive computer-understandable meaning from natural language input. The International Organization for Standardization (ISO) (e.g., ISO/TC37/SC4) publishes standards for NLP. Semantic analysis is the implementation of computer processes to generate computer-understandable representations of natural language expressions. Semantic analysis can be used to construct meaning representations, semantic underspecification, anaphora resolution, presupposition projection and quantifier scope resolution, which are known in the art. Semantic analysis is frequently used with NLP to derive computer-understandable meaning from natural language input. An unstructured information management architecture (UIMA), which is an industry standard for content analytics, may be used by the ERTE 114, CIE 116, PAE 118 and/or or AI conversation service 120 to implement NLP and semantic analysis.

In addition, the extraction of context data from the data received from the various data sources 106-112 by the ERTE 114, CIE 116, PAE 118 and/or or AI conversation service 120 further can include implementing a multivariate analysis (MVA). The MVA may include implementing an inverse design where any variable can be treated as an independent variable, an Analysis of Alternatives (AoA) in which concepts are selected to fulfil a customer need, an analysis of concepts with respect to changing scenarios, and so on. Further, the MVA can implement a factor analysis to uncover the latent structure (dimensions) of a set of variables. The factor analysis can reduce the attribute space from a larger number of variables to a smaller number of factors, thereby improving processor efficiency at extracting context data from the data received from the various data sources 106-112.

The extraction of context data from the data received from the various data sources 106-112 by the ERTE 114, CIE 116, PAE 118 and/or or AI conversation service 120 further may include implementing cognitive analytics on the received data. Cognitive analytics uses analytical strategies that draw inferences from existing data and patterns, and draws conclusions based on the inferences and existing knowledge bases. In one non-limiting arrangement, the ERTE 114, CIE 116, PAE 118 and/or or AI conversation service 120 may interface with a cognitive analytics system, such as IBM Watson®, to offload the cognitive analytics to that system.

The system 104 can access the internal documents 106, the web pages 108, the social media systems 110, the client interview data 112, the AI conversation service and, optionally, the cognitive analytics system, via a communication network 124. The communication network 124 is the medium used to provide communications links between various devices and data processing systems connected together within the environment 100. The communication network 124 may include connections, such as wire, wireless communication links, or fiber optic cables. The communication network 124 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

Referring to FIG. 1B, the data processing system 104 further can include a machine learning modeler 126, a demonstration functionality selector 128, a demonstration data selector 130 and a layer customizer 132. The machine learning modeler 126 can be configured to access the multivariate profile 102, for example from a database in which it is stored, and process the multivariate profile 102 to classify a target audience (e.g., audience members) into a category, for example an audience type selected from a plurality of predefined audience types. The predefined audience types can include types directed to nature of businesses and/or organizations to which the audience members belong or represent (e.g., banks, retail businesses/organizations, service businesses/organizations, small business/organizations, large business/organizations, local public organizations, county public organizations, state or province public organizations, federal public organizations, etc.), roles of the audience members in the businesses/organizations, demographics, geographical locations, languages/dialects spoken, and so on. The machine learning modeler 126 can be configured to determine from the multivariate profile 102 aspects of a product in which the audience members are, or may be, interested, concerns of the audience members in the product (e.g., features, use, deployment, etc.), questions of the audience pertaining to the product, and so on. The machine learning modeler 126 can pass to the demonstration functionality selector 128 and the demonstration data selector 130 the data indicating the category to which the audience is classified, as well as other information determined by the machine learning modeler 126. For example, the machine learning modeler 126 can to a data storage device, for example memory elements of the data processing system 104 or an external data storage device, accessible by the demonstration functionality selector 128 and the demonstration data selector 130.

In one arrangement, the machine learning modeler 126 can include a support vector machine SVM (or a support vector network), which may be used to classify the target audience into a category. A SVM is a supervised learning model with associated learning algorithms that analyze data used for classification and regression analysis. Given a set of training examples, each marked as belonging to a particular category, the machine learning modeler 126 can implement a SVM training algorithm to build a model that assigns new examples to particular categories, making it a non-probabilistic classifier, such as a linier classifier, or a probabilistic classifier. A SVM model is a representation of the examples as points in space, mapped so that the examples of the separate categories are divided by a clear gap that is as wide as possible. New examples are then mapped into that same space and predicted to belong to a category based on which side of the gap they fall. In addition to performing linear classification, the SVM also can perform a non-linear classification using what is called "the kernel trick," implicitly mapping their inputs into high-dimensional feature spaces. When data are not labeled, an unsupervised learning approach may be used. The unsupervised learning approach can attempt to find natural clustering of the data to groups, and then map new data to these formed groups.

The machine learning modeler 126 also can use naive Bayes classifiers to classify the target audience into a category. Naive Bayes classifiers are a family of simple probabilistic classifiers based on applying Bayes' theorem with strong (naive) independence assumptions between features. The probabilistic classifiers are models that assign class labels to problem instances, represented as vectors of feature values, where the class labels are drawn from a finite set. Naive Bayes classifiers assume that the value of a particular feature is independent of the value of any other feature, given the class variable. For some types of probability models, the machine learning modeler 126 can train naive Bayes classifiers in a supervised learning setting, though this need not be the case.

The demonstration functionality selector 128 can access data stored by the machine learning modeler 126 and select product customization options 134 for the product based on such data. For example, the demonstration functionality selector 128 can access the product customization options 134 from a database. The selected product customization options 134 can include customization data including a specification of features or functions of the product to be activated when demonstrating the product. The selected product customization options 134 also can include customization data including configuration data for configuring the product. For example, if the product is a computer program, the selected product customization options 134 can include a specification of features or functions of the computer program to be activated when demonstrating the computer program and configuration data for configuring the computer program.

The demonstration functionality selector 128 can select product customization options 134 that are assigned to the category to which the audience is classified. Further, the demonstration functionality selector 128 can select product customization options 134 that may be used to customize the demonstration to focus on features of the product the audience members are, or may be, interested, concerns of the audience members in the product, questions of the audience pertaining to the product, and so on. The demonstration functionality selector 128 can directly pass the selected product customization options 134 to the layer customizer 132, or can indicate the selected product customization options 134 to the layer customizer 132, for example by passing to the layer customizer 132 data the layer customizer 132 may use to access the selected product customization options 134.

The demonstration data selector 130 can access data stored by the machine learning modeler 126 and can select data sets 136 for use in demonstrating the product. For example, the demonstration functionality selector 128 can access the data sets 136 from a database. The selected data sets 136 can include customization data that includes at least one piece of demonstration data to be processed by the product when demonstrating the product. For example, if the product is a computer program, the selected data sets 136 can include at least one piece of demonstration data to be processed by the computer program when demonstrating the computer program.

The demonstration data selector 130 can select data sets 136 that are assigned to the category to which the audience is classified. Further, the demonstration data selector 130 can select data sets 136 that may be used to customize the demonstration to focus on features of the product the audience members are, or may be, interested, concerns of the audience members in the product, questions of the audience pertaining to the product, demographics of the audience members, geographical locations of the audience members, languages/dialects spoken by the audience members, and so on. In illustration, if the members of a target audience work in a particular geographic region, the demonstration data selector 130 can select data sets 136 relevant to that geographic region, for instance data sets 136 containing text written in a language/dialect spoken in the geographic region, data sets 136 containing information pertinent to the geographic region, etc. The demonstration data selector 130 can directly pass the selected data sets 136 to the layer customizer 132, or can indicate the selected data sets 136 to the layer customizer 132, for example by passing to the layer customizer 132 data the layer customizer 132 may use to access the selected data sets 136.

The layer customizer 132 can customize layers of the product 138, for example a functional layer 140 and a data layer 142 of the product 138, to configure the product 138 for the demonstration. During the customization, the layer customizer 132, or another component of the system 104, can load the product 138, at least temporarily, into memory elements of the system 104. Responsive to completion of the customization of the product 138, the layer customizer 132, or another component of the system 104, can output the customized product 138, for example to persistent storage in the system 104 or to an external storage device.

In illustration, the layer customizer 132 can receive or retrieve the selected product customization options 134 and use the selected product customization options 134 as configuration data to configure the functional layer 140 of the product 138 for the demonstration. For instance, the layer customizer 132 can configure the functional layer 140 by modifying a configuration file of the product 138 in accordance with data/parameters specified by the selected product customization options 134. The configuration file can control which aspects/features of the product 138 (e.g., user interfaces, tabs, menus, modules, databases, data tables, computer program code, etc.) are available for execution when the product 138 is executed.

By way of example, assume the product is a material requirements planning (MRP) computer program being offered for sale to a business that manufactures vehicles. Also assume that the members of the target audience include people that work in the purchasing department of the business and people who work in the inventory management department of the business. The selected product customization options 134 can be options that are directed to use by a purchasing department of a vehicle manufacturer and options that are directed to use by an inventory management department of a vehicle manufacturer. The layer customizer 132 can automatically customize the functional layer 140 of the product 138 to present during the demonstration user interfaces configured for use by the purchasing department and inventory management department, and to make available to the functional layer of the product 138 processes/modules that would be executed by the product 138 for purchasing and inventory management computer operations.

The layer customizer 132 can receive or retrieve the selected data sets 136 and use the selected data sets 136 as demonstration data to customize the data layer 142 of the product 138 for the demonstration. For instance, the layer customizer 132 can insert into data tables used by the product 138 data from the selected data sets 136. In illustration, if the layer customizer 132 configures the functional layer 140 to use certain data tables for the demonstration, the layer customizer 132 can add to the data tables the selected data sets 136 to be used for the demonstration. In an arrangement in which the selected data sets 136 already are contained in the data tables, the layer customizer 132 can make those data sets 136 available for use in the demonstration while making other data sets unavailable, for example by setting availability flags defined in records of the data tables.

Continuing with the previous MRP example, the selected data sets 136 can be data sets representing purchasing data and inventory management data for components used in vehicle manufacturing. Further, the selected data sets 136 can include text written in the language/dialect spoken by the members of the target audience. If the multivariate profile 102 indicates that one or more members of the target audience may have a concern as to the generation of purchase orders, the selected data sets 136 can include data for generating purchase orders. The layer customizer 132 can automatically configure the data layer 142 to use the selected data sets 136 during the demonstration.

The customized product 138, including the customized functional layer 140 and the customized data layer 142 can be deployed to a demonstration system 144, for example a data processing system, that will present the demonstration of the product 138. The demonstration system 144 can present the customized version of the product 138 during a demonstration to the target audience. Because the functional layer 140 and the data layer 142 of the product 138 are customized for the target audience, the audience members will be more attentive to, and involved with, the demonstration than they would be if the product 138 were demonstrated without the customizations. Moreover, interaction of the audience members with the product 138, for example a user interface of the product 138, will be improved because audience members will be familiar with the context of aspects of the product 138 being demonstrated since the product customization options 134 and data sets 136 used in the demonstration are specifically selected for those audience members as described herein.

Figure 2:
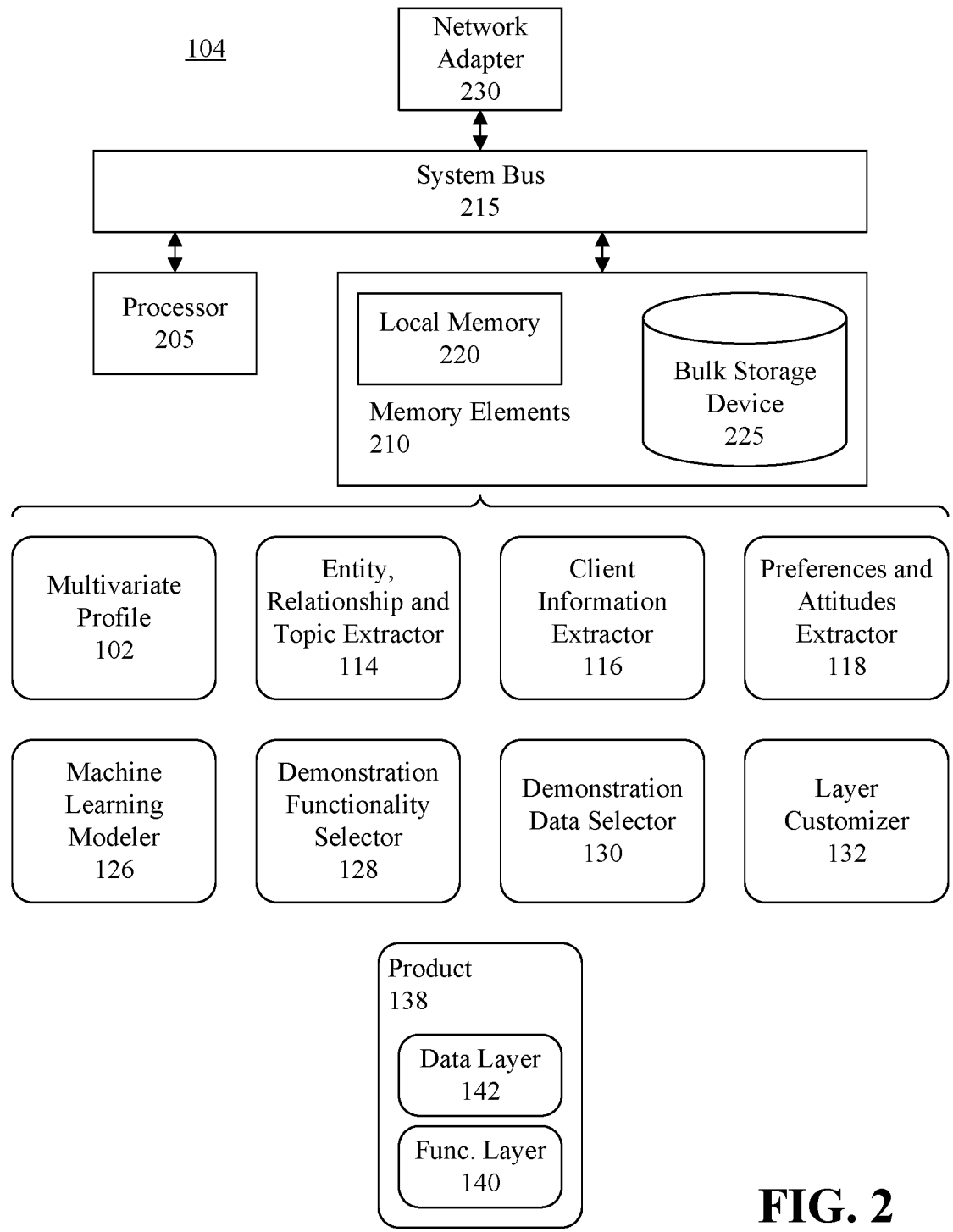
FIG. 2 is a block diagram illustrating example architecture for a data processing system.

FIG. 2 is a block diagram illustrating example architecture for the data processing system (system) 104 of FIGS. 1A and 1B. The system 104 can include at least one processor 205 (e.g., a central processing unit) coupled to memory elements 210 through a system bus 215 or other suitable circuitry. As such, the system 104 can store program code within the memory elements 210. The processor 205 can execute the program code accessed from the memory elements 210 via the system bus 215. It should be appreciated that the system 104 can be implemented in the form of any system including a processor and memory that is capable of performing the functions and/or operations described within this specification. For example, the system 104 can be implemented as a server, a plurality of communicatively linked servers, a workstation, a desktop computer, a mobile computer, a tablet computer, a laptop computer, a netbook computer, a smart phone, a personal digital assistant, a set-top box, a gaming device, a network appliance, and so on.

The memory elements 210 can include one or more physical memory devices such as, for example, local memory 220 and one or more bulk storage devices 225. Local memory 220 refers to random access memory (RAM) or other non-persistent memory device(s) generally used during actual execution of the program code. The bulk storage device(s) 225 can be implemented as a hard disk drive (HDD), solid state drive (SSD), or other persistent data storage device. The system 104 also can include one or more cache memories (not shown) that provide temporary storage of at least some program code in order to reduce the number of times program code must be retrieved from the bulk storage device 225 during execution.

One or more network adapters 230 can be coupled to system 104 to enable the system 104 to become coupled to other systems, computer systems, remote printers, and/or remote storage devices through intervening private or public networks. Modems, cable modems, transceivers, and Ethernet cards are examples of different types of network adapters 230 that can be used with the system 104.

As pictured in FIG. 2, the memory elements 210 can store the components of the system 104 of FIGS. 1A and 1B, namely the multivariate profile 102, the ERTE, the CIE 116, the PAE 118, the machine learning modeler 126, the demonstration functionality selector 128, the demonstration data selector 130, and the layer customizer 132. As noted, the memory elements also can store, at least temporarily, the product 138, including the functional layer 140 and the data layer 142. Being implemented in the form of executable program code, the ERTE, the CIE 116, the PAE 118, the machine learning modeler 126, the demonstration functionality selector 128, the demonstration data selector 130, and the layer customizer 132 can be executed by the system 104 and, as such, can be considered part of the system 104. Moreover, the ERTE, the CIE 116, the PAE 118, the machine learning modeler 126, the demonstration functionality selector 128, the demonstration data selector 130, the layer customizer 132 and the product 138 are functional data structures that impart functionality when employed as part of the system 104. The multivariate profile 102 also is a functional data structure that imparts functionality when processed by the system 104. The customized product 138 also is a functional data structure which, as noted, can be output by the system 104.

Figure 3:
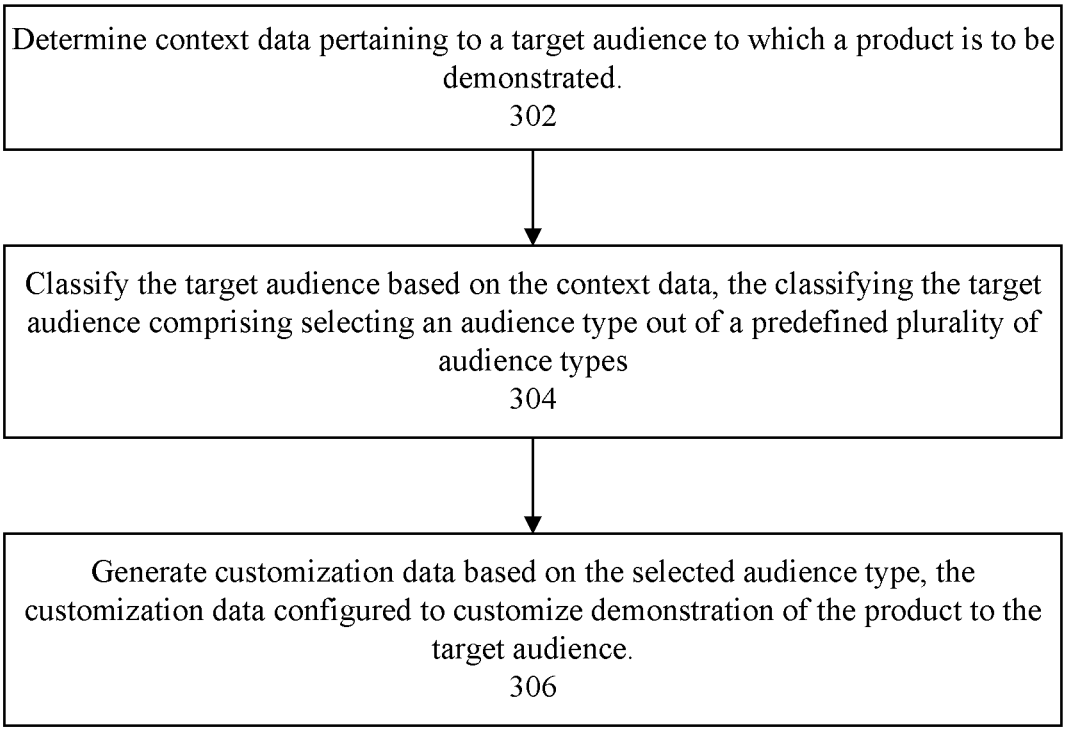
FIG. 3 is a flowchart illustrating an example of a method of generating customization data configured to customize demonstration of a product to a target audience.

FIG. 3 is a flowchart illustrating an example of a method 300 of generating customization data configured to customize demonstration of a product to a target audience. At step 302, the system 104 can determine context data pertaining to a target audience to which a product is to be demonstrated. Determining the context data can comprise analyzing content of web pages related to the target audience, analyzing social media content related to the target audience and/or analyzing content of messages exchanged with the target audience.

At step 304, the system 104 can classify the target audience based on the context data, the classifying the target audience comprising selecting an audience type out of a predefined plurality of audience types. At step 306, the system 104 can generate customization data based on the selected audience type, the customization data configured to customize demonstration of the product to the target audience. In one arrangement, the product can be a computer program, and the customization data can comprise at least one piece of demonstration data to be processed by the computer program when demonstrating the computer program, configuration data for configuring the computer program and/or a specification of features or functions of the computer program to be activated when demonstrating the computer program.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items.

It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining context data pertaining to a target audience to which a computer program is to be demonstrated;
    generating, based on the context data, a multivariate profile reflecting an industry related to the target audience;
    classifying, using a processor, the target audience based on the multivariate profile, the classifying the target audience comprising selecting an audience type out of a predefined plurality of audience types;
    generating customization data based on the selected audience type, the customization data configured to customize demonstration of the computer program to the target audience, the customization data comprising:
        a specification of features or functions of the computer program to be activated when demonstrating the computer program; and
        configuration data comprising at least one piece of demonstration data to be processed by the computer program when demonstrating the computer program to the target audience, the demonstration data selected based on the industry related to the target audience;
    automatically customizing the computer program using the customization data by:
        modifying a configuration file of the computer program in accordance with customization data, the configuration file activating the features or functions of the computer program and specifying the demonstration data for use by the computer program, and the configuration file controlling computer program code available for execution when the computer program is executed; and
        configuring the computer program with the configuration data comprising the at least one piece of demonstration data to be processed by the computer program when demonstrating the computer program to the target audience; and
    demonstrating, on a display or by a projector, to the target audience the computer program customized by the activating the features or functions of the computer program, the demonstrating the computer program comprising executing, by the computer program, the computer program code controlled by the configuration file and processing, by the computer program, the at least one piece of demonstration data, explaining how the computer program works and enabling a presenter or the members of the target audience to interact with the computer program via a user interface of the computer program.

2. The method of claim 1, wherein the determining the context data further comprises analyzing content of messages exchanged with the target audience.

3. The method of claim 1, wherein the determining the context data further comprises analyzing second data, received from a social media system, from posts in the social media made by at least one member of the target audience.

4. The method of claim 1, wherein the determining the context data further comprises analyzing second data, received from a social media system, from posts in the social media made by at least one leader of an organization, wherein the members of the target audience are members of the organization.

5. The method of claim 1, wherein the determining the context data further comprises analyzing second data, received from a social media system, from advertisements presented for an organization in the social media system, wherein the members of the target audience are members of the organization.

6. The method of claim 1, wherein:
the multivariate profile further reflects a purchasing behavior related to the target audience; and
the demonstration data further is selected based on the purchasing behavior related to the target audience.

7. A system, comprising:
a processor programmed to initiate executable operations comprising:
determining context data pertaining to a target audience to which a computer program is to be demonstrated;
generating, based on the context data, a multivariate profile reflecting an industry related to the target audience;
classifying the target audience based on the multivariate profile, the classifying the target audience comprising selecting an audience type out of a predefined plurality of audience types;
generating customization data based on the selected audience type, the customization data configured to customize demonstration of the computer program to the target audience, the customization data comprising:
a specification of features or functions of the computer program to be activated when demonstrating the computer program; and
configuration data comprising at least one piece of demonstration data to be processed by the computer program when demonstrating the computer program to the target audience, the demonstration data selected based on the industry related to the target audience;
automatically customizing the computer program using the customization data by:
modifying a configuration file of the computer program in accordance with customization data, the configuration file activating the features or functions of the computer program and specifying the demonstration data for use by the computer program, and the configuration file controlling computer program code available for execution when the computer program is executed; and
configuring the computer program with the configuration data comprising the at least one piece of demonstration data to be processed by the computer program when demonstrating the computer program to the target audience; and
demonstrating, on a display or by a projector, to the target audience the computer program customized by the activating the features or functions of the computer program, the demonstrating the computer program comprising executing, by the computer program, the computer program code controlled by the configuration file and processing, by the computer program, the at least one piece of demonstration data, explaining how the computer program works and enabling a presenter or the members of the target audience to interact with the computer program via a user interface of the computer program.

8. The system of claim 7, wherein the determining the context data further comprises analyzing content of messages exchanged with the target audience.

9. The system of claim 7, wherein the determining the context data further comprises analyzing second data, received from a social media system, from posts in the social media made by at least one member of the target audience.

10. The system of claim 7, wherein the determining the context data further comprises analyzing second data, received from a social media system, from posts in the social media made by leaders of an organization, wherein the members of the target audience are members of the organization.

11. The system of claim 7, wherein the determining the context data further comprises analyzing second data, received from a social media system, from advertisements presented for an organization in the social media system, wherein the members of the target audience are members of the organization.

12. The system of claim 7, wherein:
the multivariate profile further reflects a purchasing behavior related to the target audience; and
the demonstration data further is selected based on the purchasing behavior related to the target audience.

13. A computer program product, comprising:
a computer readable storage medium having program code stored thereon, the program code executable by a data processing system to initiate operations including:
determining context data pertaining to a target audience to which a computer program is to be demonstrated;
generating, based on the context data, a multivariate profile reflecting an industry related to the target audience;
classifying the target audience based on the multivariate profile, the classifying the target audience comprising selecting an audience type out of a predefined plurality of audience types;
generating customization data based on the selected audience type, the customization data configured to customize demonstration of the computer program to the target audience, the customization data comprising:
a specification of features or functions of the computer program to be activated when demonstrating the computer program; and
configuration data comprising at least one piece of demonstration data to be processed by the computer program when demonstrating the computer program to the target audience, the demonstration data selected based on the industry related to the target audience;

automatically customizing the computer program using the customization data by:

modifying a configuration file of the computer program in accordance with customization data, the configuration file activating the features or functions of the computer program and specifying the demonstration data for use by the computer program, and the configuration file controlling computer program code available for execution when the computer program is executed; and configuring the computer program with the configuration data comprising the at least one piece of demonstration data to be processed by the computer program when demonstrating the computer program to the target audience; and demonstrating, on a display or by a projector, to the target audience the computer program customized by the activating the features or functions of the computer program, the demonstrating the computer program comprising executing, by the computer program, the computer program code controlled by the configuration file and processing, by the computer program, the at least one piece of demonstration data, explaining how the computer program works and enabling a presenter or the members of the target audience to interact with the computer program via a user interface of the computer program.

14. The computer program product of claim 13, wherein the determining the context data further comprises analyzing content of messages exchanged with the target audience.

15. The computer program product of claim 13, wherein the determining the context data further comprises analyzing second data, received from a social media system, from posts in the social media made by at least one member of the target audience.

16. The computer program product of claim 13, wherein the determining the context data further comprises analyzing second data, received from a social media system, from posts in the social media made by leaders of an organization, wherein the members of the target audience are members of the organization.

17. The computer program product of claim 13, wherein the determining the context data further comprises analyzing second data, received from a social media system, from advertisements presented for an organization in the social media system, wherein the members of the target audience are members of the organization.

18. The computer program product of claim 13, wherein:

the multivariate profile further reflects a purchasing behavior related to the target audience; and the demonstration data further is selected based on the purchasing behavior related to the target audience.

* * * * *